Dec. 18, 1962 C. P. CABELL 3,069,337
IRRADIATION METHOD AND APPARATUS
Filed Nov. 26, 1951 5 Sheets-Sheet 1

FIG.1

INVENTOR.
*Charles P. Cabell*
BY
*Roland A. Anderson*
*Attorney*

Dec. 18, 1962 C. P. CABELL 3,069,337
IRRADIATION METHOD AND APPARATUS
Filed Nov. 26, 1951 5 Sheets-Sheet 2

INVENTOR.
Charles P. Cabell
BY
Roland A. Anderson
Attorney

Dec. 18, 1962 C. P. CABELL 3,069,337
IRRADIATION METHOD AND APPARATUS
Filed Nov. 26, 1951 5 Sheets-Sheet 5

INVENTOR.
Charles P. Cabell
BY
Roland A. Anderson
Attorney

United States Patent Office 3,069,337
Patented Dec. 18, 1962

3,069,337
IRRADIATION METHOD AND APPARATUS
Charles P. Cabell, Richland, Wash., assignor to the United States of America as represented by the United States Atomic Energy Commission
Filed Nov. 26, 1951, Ser. No. 258,158
14 Claims. (Cl. 204—154.2)

The present invention relates to methods of operating a neutronic reactor, and to apparatus for carrying out these methods. More specifically, the invention is related to a process and apparatus for irradiating materials within a neutronic reactor.

The neutron flux density within a neutronic reactor is a maximum at the center of the active portion of the reactor, and decreases theoretically as a cosine function to zero at the periphery of the active portion of the reactor. In actual neutronic reactors, the periphery of the active portion maintains a significant neutron flux density, but the neutron flux density distribution none the less conforms roughly to a cosine distribution.

It is thus clear, that any body irradiated in a single location within the active portion of a neutronic reactor, will receive a radiation dose which is a function of its location within the active portion of the reactor and the length of its exposure period. Efforts have been made to somewhat flatten the neutron flux density distribution across the axes of a neutronic reactor in order to minimize the differences in radiation dosage that a sample will receive if placed in different portions of the active portion of the reactor, however, such efforts have not been completely successful.

Many neutronic reactors have been constructed to irradiate desired materials in tubes traversing the active portion of the reactor. It is generally most convenient to charge these tubes with the desired materials from one end and to discharge the tubes from the other end, the materials merely being pushed through the tube from the charging end. If the materials to be irradiated could merely be pushed through the tubes at a constant rate, it is clear that all samples of the materials passing through the tubes would be irradiated with the same dose regardless of the neutron flux distribution along the length of the tube. Such a "constant flow" system for irradiating samples has not been practical in the present reactors, because of the necessity of flowing a coolant over the samples in order to carry away the excess heat generated by the absorption of radiation in the irradiated bodies, particularly when a liquid coolant is utilized which requires the use of caps on the ends of the tube. Even in the case where a coolant is not required, the "constant flow" method of irradiating materials has not been used because of the radiation which escapes from the active portion of the reactor through the open tube ends. The greater the level of neutron flux, the greater will be the difficulty in preventing the escape of neutrons and other radiations from the open ends of the tube, and hence the "constant flow" method of sample irradiation becomes completely useless in reactors operated at high power levels.

As a result of the problems arising from the cooling and shielding necessities, it has been customary to shut down the reactor for a sufficient period of time to allow the radiation intensity within the reactor to decay before the samples to be irradiated are charged into a given tube. After charging, shielding materials are inserted into the ends of the tube to prevent radiation from escaping, and the tube is capped. The reactor is then started up and operated at the desired power level for a sufficient period of time to obtain the maximum desired exposure of the samples in the portions of the tube receiving the greatest radiation dosage. The neutronic reactor is then shut down again, the caps at the ends of the tube are removed, and the samples of the irradiated material discharged by pushing them out of one end of the tube. Each tube in the reactor is charged and discharged separately, so that the differences in the distance of each tube from the center of the active portion of the reactor will not effect the radiation dose received by the samples in the tube, even though this requires shutting down the reactor frequently.

As a result of this method presently in use, the materials irradiated near the ends of the tubes in the neutronic reactor receive but a small percentage of the radiation dosage of those materials at the center of the tubes of the reactor. Further, it is clear that the number of charges and discharges permissible for irradiating a single sample in a tube must be minimized, because the reactor must be completely shut down before the charging or discharging operation can be effected. For this reason, it has generally been believed to be too expensive, in terms of operating time and labor required, to shut down a neutronic reactor more than once for each tube between the charging and discharging operation for the purpose of changing the position of the samples being irradiated in the tubes. For example, it has been thought that the reactor may be shut down to discharge the materials disposed in one half of the length of a tube at a time, since each body will then be irradiated in only two positions within the tube, but the discharge of one-third of the tube at a time would not achieve sufficiently greater uniformity of sample exposure to warrant the added economic cost of making three shutdowns in order to irradiate a given sample.

The necessity of placing shielding material at the ends of the tube complicates the charging and discharging processes which must be completed in order to irradiate a segment of the samples in a tube a plurality of times. The bodies of shielding material disposed at the charging end of a tube must be removed in order to prevent these bodies from being disposed within the active region of the reactor after new samples have been placed in the tube from the charging end. A convenient way to remove these bodies of shielding material is to force them from the charging end of the tube by pushing all of the materials in the tube toward that end from the discharge end of the tube. It is then possible to charge the tube with new samples from the charging end in a conventional manner, thereby pushing out of the discharge end both the shielding bodies and the proportion of the total charge within the tube that it is desired to remove. New shielding bodies may of course be inserted at the charging end of the tube, but the samples disposed at the discharge end of the tube must be moved toward the charging end of the tube in order to leave sufficient space to accommodate new shielding bodies at the discharge end of the tube. The tubes may then be sealed and the reactor again started up for operation.

It is an object of the present invention to provide an apparatus for carrying out methods of segmented operation with a reactor having tubes extending through the active portion thereof, including methods requiring the removal of shielding materials at the ends of the tubes and centering of the charge in the tube after a new charge has been inserted into the tube.

It is also an object of the present invention to provide methods by which neutronic reactors of the type described may be segmentally operated.

Other objects and advantages of the present invention will become readily apparent to the man skilled in the art upon a further reading of the specification, particularly when taken with reference to the drawings of which:

Figure 1:
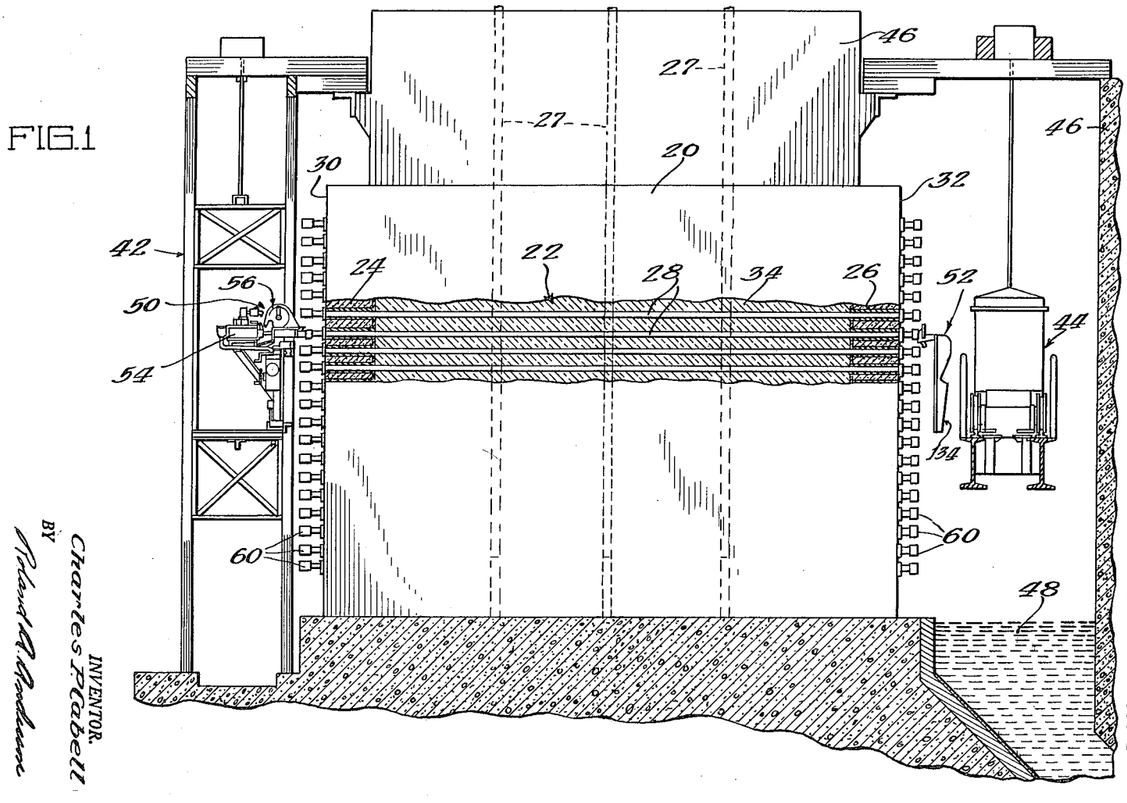
FIGURE 1 is an elevational view of the segmented discharge apparatus including a neutronic reactor, a portion of the reactor being cut away and in section.

FIGURE 1 shows generally a neutronic reactor 20 having an active portion 22 disposed between radiation shields 24 and 26. A plurality of process tubes 28 traverse the active portion 22 of the reactor 20 from a charging face 30 to a discharging face 32. The active portion 22 of the reactor comprises a moderator 34 which completely surrounds the process tubes 28, and a plurality of fuel elements 36 (illustrated in FIGURES 6 through 8) which contain thermal neutron fissionable material 40, such as uranium or plutonium. Fuel elements 36 are disposed within at least some of the process tubes 28 in the active portion 22 of the reactor 20. Each of the fuel elements 36 is cylindrical in shape and is provided with a container 38 disposed about the fissionable material 40 and constructed of a material having a low neutron capture cross section, such as aluminum or beryllium. A detailed description of a suitable fuel element for fuel element 36 is given in the copending patent application of William R. Huey, Serial No. 732,277, filed March 4, 1947, now Patent No. 2,927,071, issued March 1, 1960.

Control of the reactor 20 is maintained by positioning control rods 27 within the active portion 22 of the reactor 20. The control rods 27 are constructed of material having a high neutron capture cross section, such as boron steel.

Figures 6, 7, 8, 9, 15:
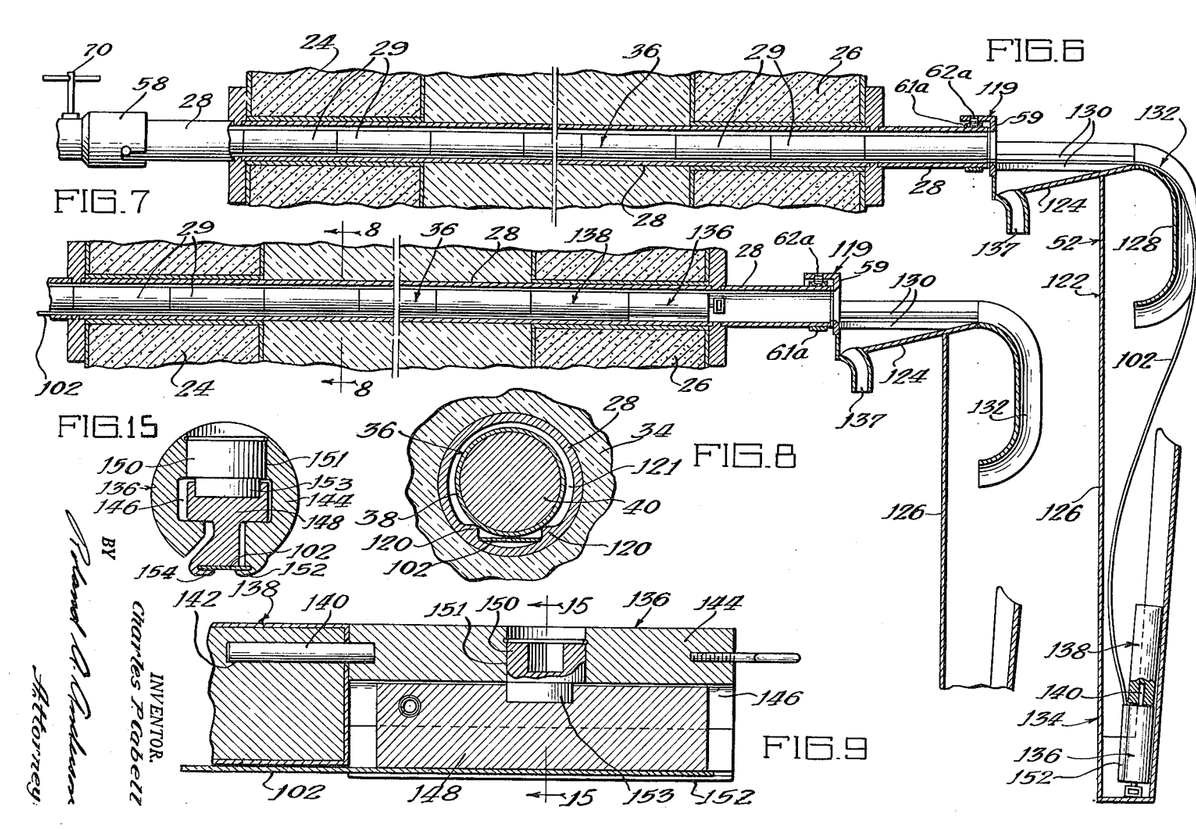
FIGURE 6 is a sectional view of one of the tubes traversing the reactor shown in FIGURE 1 with the apparatus for segemented operation attached to the ends of the tube.
FIGURE 7 is a sectional view of the tube shown in FIGURE 6 at another stage in the process of segmented operation of the reactor.
FIGURE 8 is a sectional view taken along line 8—8 of FIGURE 7.
FIGURE 9 is a sectional view of a gripper device which is a portion of the apparatus for segmented operation and is shown in elevation in FIGURES 6 and 7.
FIGURE 15 is a transverse sectional view taken along line 15—15 of FIGURE 9.

At each end of each process tube 28 in the reactor as shown in FIGURES 6 and 7, shielding slugs 29 are disposed to prevent the escape of radiation from the active portion 22 of the reactor 20 through the ends of the process tubes 28. These shielding slugs 29 are constructed of material having good radiation absorption properties, such as lead.

A charging elevator 42 is disposed adjacent to the charging face 30 of the reactor 20, and a discharging elevator 44 is disposed adjacent to the discharging face 32. A radiation shield 46, partially illustrated, encloses the reactor 20. Beneath the discharging elevator 44 and between the discharging face 32 and the shield 46 is disposed a pit 48 containing water.

The reactor generally described above forms no part of the present invention, and a more specific description of a suitable reactor may be had by reference to Fermi et al. Patent 2,708,656, dated May 17, 1955, or the copending application of Leo A. Ohlinger, Eugene P. Wigner, Alvin M. Weinberg and Gale J. Young, Serial No. 568,900 filed December 19, 1944, now Patent No. 2,890,158, dated June 9, 1959.

FIGURE 1 also generally illustrates a charging assembly 50 mounted on the charging face elevator 42 and positioned adjacent to one of the process tubes 28 on the charging face 30 of the reactor 20, and a discharging assembly 52 attached to the same process tubes 28 on the discharge face 32 of the reactor. It will be understood that both the charging assembly 50 and the discharging assembly 52 are removed from the charging face 30 and discharging face 32 when the reactor 20 is in operation, and that FIGURE 1 illustrates the apparatus in position for segmented discharge of the reactor 20. Also, the discharging elevator 44 is raised above the process tube 28 which is being discharged during the period of discharging operations, so that the fuel elements 36, or other bodies being discharged cannot fall upon the discharge elevator 44 and contaminate it with radio-activity.

Figures 2, 3, 4:
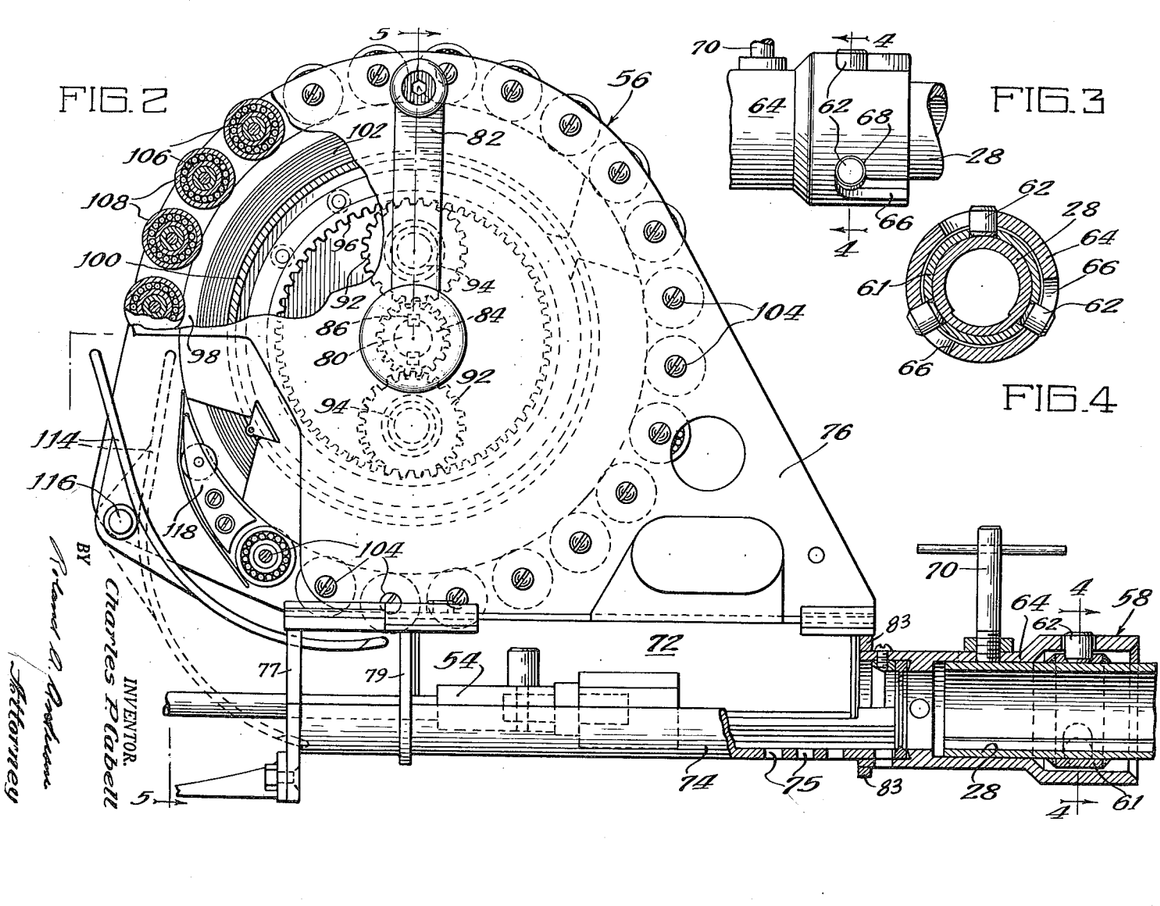
FIGURE 2 is a view of a tape reel illustrated generally in conjunction with the reactor in FIGURE 1, the tape reel being shown partially in elevation and partially in section.
FIGURE 3 is an elevational view of the junction between the tape reel and the neutronic reactor.
FIGURE 4 is a sectional view taken along line 4—4 of FIGURE 2.

The charging assembly 50 consists generally of a pneumatic charging machine 54, which is generally indicated in FIGURE 1 and partially illustrated in FIGURE 2, and a tape reel 56. The pneumatic charging machine 54 may be any of the well known charging machines used in the art, or the charging machine operations may be accomplished by a hand-operated plunger.

The tape reel 56 is shown in detail in FIGURES 2 through 5. It is provided with a bayonet locking nozzle 58, shown in FIGURES 2 through 4 and 6, which is adapted to be connected to the end of one of the process tubes 28 of the neutronic reactor 20. The ends of the tubes 28 are capped with caps 60 which are attached to the ends of the tubes by an identical bayonet locking construction. In this locking construction, a sleeve 61 is secured about the ends of the process tubes 28, and the sleeve 61 is provided with equally spaced locking pins 62 which may be welded to the outer surface of sleeve 61. The locking nozzle 58 has a tubular connecting member 64 with a diameter slightly greater than the diameter of the sleeves 61 on the process tubes 28 and which is adapted to slide over one of the sleeves 61 at the end of a process tube 28. The open end of the connecting member 64 has a larger diameter and is provided with axial grooves 66 adapted to accommodate each of the locking pins 62 on the end of the process tubes 28. The grooves 66 have slots 68 at their inner ends large enough to accommodate the locking pins 62 on the process tube 28, so that the locking pins 62 on the process tube 28 may be disposed in the slots 68 of the locking nozzle 58 and secure the tape reel 56 to the reactor 20. A setscrew 70 threaded through the connecting member 64 of the locking nozzle 58 contacts the process tube 28 and secures the tape reel 56 to the process tube 28.

The housing 72 of the tape reel 56 is attached to the locking nozzle 58. The housing 72 includes a trough 74 which is aligned with the process tube 28 of the reactor 20 and a pair of parallel supporting plates 76 which are attached to the open edges of the trough 74. The trough 74 is secured to the parallel supporting plates 76 by a pair of brackets 77 and 79 adjacent to one end of the trough and by a support member 83 secured between the plates 76 and the trough 74 at the other end thereof. A feed tray 78 for fuel elements, or other bodies which are to be irradiated within the reactor 20, is affixed to one side of the trough 74 and inclined at a slight angle, so that it may feed bodies into the trough 74. Water outlets 75 are provided in the bottom of the trough 74 to allow cooling water spilling into the trough from the open process tubes 28 to flow out of the trough 74.

Figure 5:
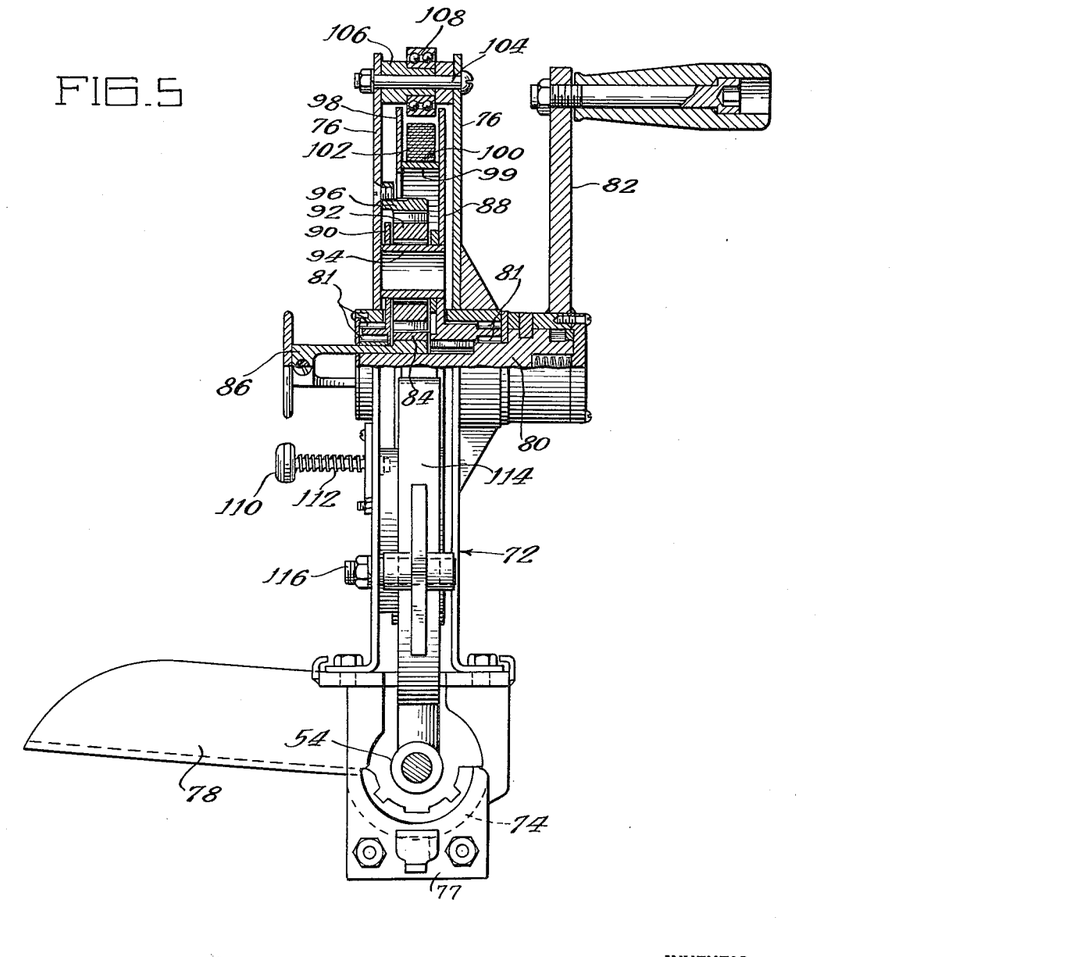
FIGURE 5 is a sectional view taken along line 5—5 of FIGURE 2.

An axle 80 is rotatably disposed through the center portion of the plates 76, and is attached to a crank 82. A pinion gear 84 is keyed to the axle 80 by a key 86 and rotates with the axle 80. A pair of plate shaped support members 88 and 90 are disposed parallel to each other and between the supporting plates 76. They are rotatably mounted with respect to the supporting plates 76 and the axle 80 by means of needle bearings 81, so that the support members 88 and 90 are free to rotate with respect to both the axle 80 and the housing 72. One pair of idler gears 92 is rotatably disposed about idler shafts 94, the idler shafts being affixed between the supporting members 88 and 90 on opposite sides of the axle 80. The idler gears 92 are meshed with the pinion gear 84 and a ring gear 96 which is affixed to one of the supporting plates 76 adjacent to the support member 90, the support member 90 being radially smaller than the support member 88. Hence, rotation of the pinion gear 84 rotates the idler gear 92, and causes the support members 88 and 90 to revolve between the supporting plates 76. A support ring 98 is affixed to the support member 88 near its periphery by a drum 99, and forms a trough 100 into which a tape 102 may be disposed. The two supporting plates 76 are maintained parallel by pins 104 and bushings 106 disposed about the periphery of the plates 76. Ball bearings 108 are rotatably disposed upon the bushings 106 confronting the trough 100.

A release button 110 is journaled through one of the supporting plates 76 and confronts the supporting member 90. The release button 110 is normally held free from engagement with the supporting member 90 by a spring 112. The release button 110 must be forced toward the support member 90 to engage it and effect a braking action upon the rotatable portions of the tape reel 56.

A tape guide 114 is pivoted on a pin 116 attached between the supporting plates 76 to guide the tape 102 from the rotating trough 100 into the housing trough 74 when it is unwound from the tape reel 56. The tape guide 114 is aligned with the ball bearings 108 about the periphery of the supporting plates 76 to form a continuous low friction surface upon which the tape 102 may travel when being unwound. The tape guide 114 may also be pivoted, so that the end of the guide 114 which is disposed adjacent to the housing trough 74 when in operation may be removed from the end of the trough to permit other operations to be described later. A wedge shaped shoe 118 is also mounted between the supporting plates 76 adjacent to the guide 114 for the purpose of providing a low friction surface for the tape 102 to traverse when being wound onto the rotatable trough 100.

When the tape 102 is inserted into the reactor 20, it extends through the housing trough 74 of the tape reel 56 and through one of the process tubes 28 of the reactor 20. The process tubes 28 are provided with ribs 120 on their lower surface for supporting the fuel elements 36 centrally in the process tubes 28, the gap between the fuel elements 36 and the process tubes 28 being a water annulus 121 for coolant water to circulate through. The tape 102 slides in the space beneath the fuel elements 36 and between the ribs 120 on the process tubes 28.

Figures 10, 11, 12, 13, 14:
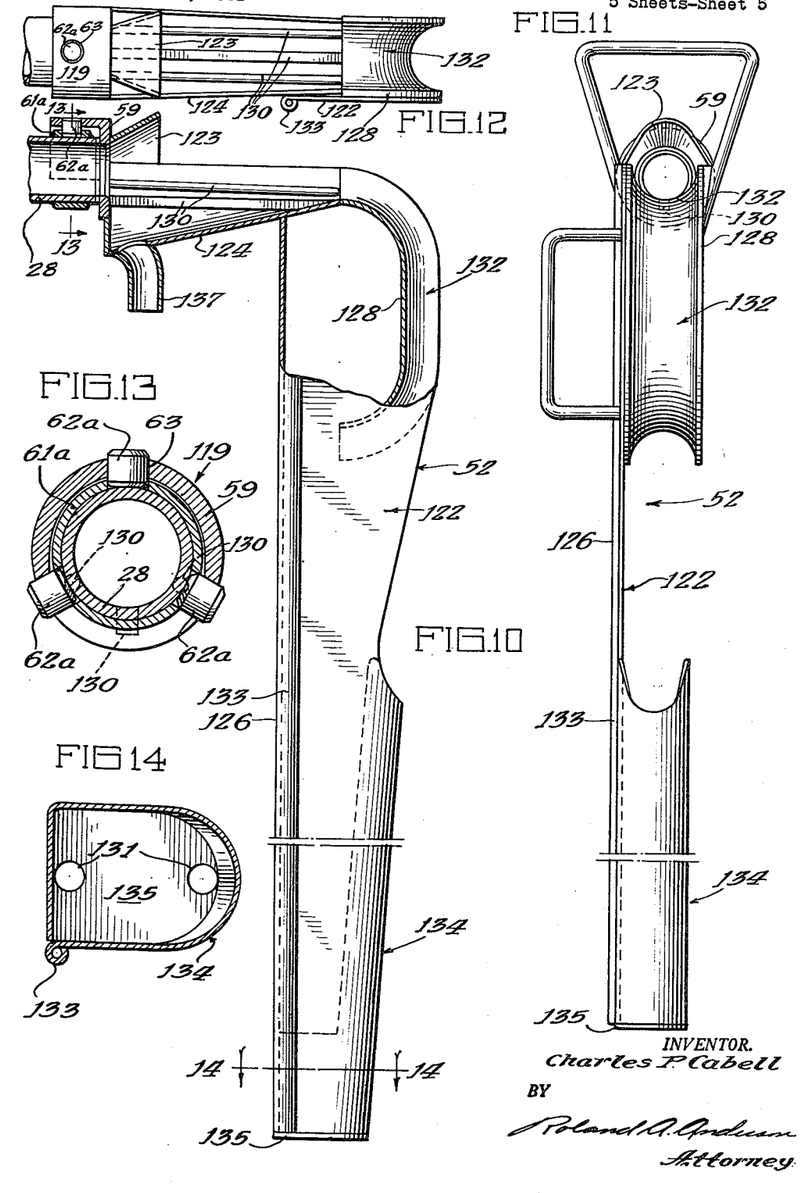
FIGURE 10 is a side elevational view of the segmented operation apparatus used at the discharge end of a tube, partially broken away and in section.
FIGURE 11 is a back elevational view of the apparatus shown in FIGURE 10.
FIGURE 12 is a plan view of the apparatus shown in FIGURE 10.
FIGURE 13 is a sectional view taken along line 13—13 of FIGURE 10.
FIGURE 14 is a sectional view taken along line 14—14 of FIGURE 10.

The discharge assembly 52 mounts on the end of one of the process tubes 28 at the discharge face 32 of the reactor 20. This end of the process tube 28 is constructed in a manner identical to the construction of the end adjacent to the charging face 30 of the reactor 20. The process tube 28 is provided with a sleeve 61a to which three equally spaced locking pins 62a have been affixed, one of the locking pins 62a being disposed on the top of the process tube 28, as illustrated in FIGURE 13. Although it is removable from the reactor, the discharge assembly 52 will be described mounted to the reactor 20. The discharge assembly 52 is provided with a connecting element 119 constructed to fit about the sleeve 61a at the end of the process tube 28. It has a curved yoke 59 provided with an aperture 63 for accommodating the locking pin 62a at the top of the process tube 28. The yoke 59 also forms slightly less than a 240 degree arc, so that the ends of the yoke 59 contact the other two locking pins 62a.

A flared guide plate 123 is attached to the yoke 59 and funnels into the process tube 28 when the discharge assembly 52 is attached to the reactor 20. The discharge assembly 52 has a supporting frame 122 generally shaped in the form of an L, with the shorter portion 124 of the L attached to the yoke 59 of the connecting element 119. The longer portion 126 of the supporting frame 122 extends from the shorter portion 124 in a downward direction parallel to the discharge face 32 of the reactor 20. The shorter portion 124 extends beyond the point of junction with the longer portion 126 of the supporting frame 122, and connects with a curved or U-shaped channel 128 which extends downwardly roughly parallel to the longer portion 126 of the frame 122. A number of rods 130 are securely attached to the connecting element 119 at the bottom thereof and to the frame 122 at the point of junction of the shorter portion 124 and the channel 128 to form a continuous slideway 132. The slideway 132 has a radius of curvature slightly greater than the curvature of the fuel elements 36, so that the fuel elements 36 will slide freely along the slideway 132. A water outlet 137 is provided in the shorter portion 124 of the frame 122 to remove the coolant water spilling from the process tube 28 onto the frame 122.

The longer portion 126 of supporting frame 122 is constructed of sheet metal and provided with a rolled edge 133 for strength, the portion adjacent to the rolled edge 133 being fastened to the channel 128 and shorter portion 124. A container 134 is formed at the bottom of the longer portion 126 by bending the metal sheet and affixing a bottom 135. The container 134 has an open top and size to accommodate a gripper slug 136 and a shielding slug 138 in a vertical position. Since the container 134 is disposed beneath the shorter portion 124 of the frame 122, objects falling from the slideway 132 will clear the container 134. Apertures 131 are provided in the container 134 to drain leakage water from the container 134.

The gripper slug 136 and a portion of the shielding slug 138 are shown in FIGURE 9. The shielding slug is attached to the gripper slug 136 by means of a pin 140 affixed in one end of the gripper slug 136 and slidably disposed within an aperture 142 in the shielding slug 138. The shielding slug 138 is constructed for radiation absorbing materials, such as boron steel or lead.

The details of the gripper slug 136 are more fully disclosed in the application of H. J. Belarts, Serial No. 258,165, filed November 26, 1951, and will only be generally described here. The gripper slug 136 has a cylindrical body 144 provided with a longitudinal aperture 146. Within the aperture 146 is disposed a gripper 148 which is slidable with respect to the body 144. An eccentric locking nut 150 is disposed in an orifice 151 in the body 144 and has a smaller cylindrical head 153 eccentrically disposed with respect to the orifice 151 and journaled into the gripper 148, so that rotation of the locking nut 150 forces the gripper 148 toward the surface of the body 144 on one side of the aperture 146. The gripper 148 is provided with a clamp 154 and the body 144 is provided with jaws 152 positioned adjacent to the clamp 154 to secure the tape 102. The tape 102 is adapted to be disposed between the jaw 152 and the clamp 154, so that rotation of the locking nut 150 wedges the tape 102 in the gripper slug 136.

Segmented discharge of the fuel elements 36, or any other bodies which may be disposed within the process tubes 28, may be effected with the above-described apparatus in the following manner. The neutronic reactor 20 is shut down by the means provided with the reactor for this purpose, for example, by inserting the control rods 27 into the active portion 22 of the reactor 20. After the heat generated within the reactor by radiation absorption falls to permissible levels, the flow of water through the cooling annulus 121 within the process tubes 28 may also be decreased to a level sufficient to permit removal of the caps 60 from the ends of any given process tube 28 within the reactor 20. This is generally accomplished by lowering both the charging elevator 42 and the discharging elevator 44 to a position adjacent to the end of the desired process tube 28. The shielding slugs 29 disposed in the portion of the process tube which traverses the radiation shield 24 adjacent to the charging face 30 of the reactor 20 may then be removed from the process tube 28 by the exertion of force applied at the discharge end of the process tube from the discharge elevator 44. This may be accomplished by any conventional means, such as a pneumatic mechanism similar to the pneumatic charging machine 54 or a hand operated plunger, not shown. The tape reel 56 is then fastened to the end of the process tube 28 adjacent to the charging face 30 of the reactor 20, and the pneumatic charging machine 54 is placed in the proper position. The tape guide 114 on the tape reel 56 is placed in the position shown by the broken lines in FIGURE 2, and the tape 102 is inserted into the process tube 28 between the ribs 120 and beneath the fuel elements 36 therein. The tape 102 is pushed through the process tube 28 to the discharge face 32 of the reactor 20. Here the gripper slug 136 and the shielding slug 138 are affixed to the tape 102 and placed within the container 134 of the discharge tip-off assembly 52. The discharge elevator 44 is then raised above the level of the particular process tube 28 being discharged, and the tape 102 is removed from the tape reel 56 and the end of the tape 102 is secured to a point beneath the particular process tube 28 to be discharged, so that the tape 102 will not be in the path of the fuel elements 36 to be inserted into the process tube 28 through the trough 74 of the tape reel 56. New fuel elements 36 may then be inserted by the pneumatic charging machine 54, the tape guide 114 being raised to the position shown by full lines in FIGURE 2, so that it will not interfere with the passage of the new fuel elements 36 into the process tube 28. The number of new fuel elements 36 charged into the process tube 28 will depend upon the size of the segment of the process tube 28 which it is desired to discharge. For example, fuel elements 36 sufficient to fill approximately one-half of the process tube 28 traversing the active portion 22 of the reactor 20 may be charged into the process tube 28. Charging the process tube 28 with new fuel elements 36 causes a portion of the old fuel elements in the process tube 28 to be forced out of the discharge end of the tube 28 and fall into the pit 48. They are there collected and put to whatever application that is desired. However, a few of the old fuel elements will be merely forced out of the process tube 28 onto the horizontal portions of the slideway 132 of the discharge assembly 52, and there they will remain since no more new fuel elements 36 are to be inserted into the charging end of the process tube 28. These spent fuel elements 36 will be resting upon the tape 102, because there is at this point no space for the tape 102 beneath the fuel elements 36. Hence, the fuel elements 36 which are stranded upon the slideway 132 may be manipulated off of the slideway 132 and caused to drop into the pit 48 by sliding the tape 102 in the direction of the discharge face 32 of the reactor 20. These fuel elements could not be manually removed, since they remain highly radioactive and would be considered a great health hazard.

After the fuel elements 36 have been inserted into the process tube 28, shielding slugs 29 are inserted. Enough shielding slugs 29 are inserted to fill the portion of the process tube 28 which traverses the radiation shield 24. These shielding slugs 29 are pushed into the active portion 22 of the reactor 20 in order to push the segment of old fuel elements 36 to be discharged from the discharge end of the process tube 28, since they must traverse the radiation shield 26 adjacent to the discharge face 32 of the reactor 20.

The tape 102 may then be re-attached to the tape reel 56 and wound upon the trough 100 in the tape reel 56, thereby drawing the gripper slug 136 and the shielding slug 138 out of the container 134. The gripper slug 136 and the shielding slug 138 will slide with the tape 102 upon the slideway 132 and into the discharge end of the process tube 28. By further winding the tape reel 56, the entire column of fuel elements 36 and the shielding slugs 29 are drawn toward the charging face 30 of the reactor 20, and the shielding slugs 29 are positioned in the portion of the process tube 28 which traverses the radiation shield 24.

FIGURE 7 shows the disposition of the fuel elements 36, the shielding elements 29 and 138 and the gripper slug 136 in this stage of the segmented discharge operation. The discharge assembly 52 may then be removed from the discharge face 32 of the reactor. The gripper slug 136 is withdrawn from the end of the process tube 28 and removed from the tape 102. The shielding slug 138 remains in place in the process tube 28, because the pin 140 will slide out of the aperture 142 in the shielding slug 138 when the gripper slug 136 is removed. It is necessary that the shielding slug 138 remains at the discharge end of the process tube 28, since men are working upon the discharge elevator 44 and the fuel elements 36 adjacent to the discharge face 32 of the reactor 20 are highly radioactive, rather than the comparatively dormant unexposed fuel elements 36 adjacent to the charging face 30 of the reactor 20. The personnel operating the discharge face elevator 44 may then insert more shielding slugs 29 into the discharge end of the process tube 28 and replace the cap 60 on this end of the process tube 28. The discharge elevator 44 is then raised to a location above the active portion 22 of the reactor.

The tape 102 is again wound upon the tape reel 56, and the tape reel 56 is removed from the charging face 30 of the reactor 20. The process tube 28 is capped, and the charging face elevator 42 is then raised above the active portion 22 of the reactor 20. All operating personnel leave the areas near the faces 30 and 32 of the reactor 20 and the control rods 27 are partially withdrawn from the active portion 22 of the reactor 20, thus allowing the chain neutronic reaction again to assume operating level.

The friction between the tape 102 and the elements upon which the tape slides has required the special construction for the tape reel 56 described above. Rotation of the crank 82 rotates the axle 80 which traverses the central portions of the stationary supporting plates 76. The idler gears 92 rotate about the shafts 94 affixed to the support members 88 and 90, the support members 88 and 90 being rotatably mounted with respect to both the axle 80 and the supporting plates 76. Since the idler gears 92 are meshed with both the ring gear 96 and the pinion gear 84, rotation of the crank 82 causes the supporting member 88 to rotate in the same direction. Since the tape is disposed in the trough 100 attached to the supporting member 88, it is clear that rotation of the crank 82 winds or unwinds the tape 102. When the tape is being unwound, friction is prevented by running the tape against the ball bearings 108 disposed between the supporting plates 76 about the periphery of the trough 100. When it is being wound, the tape slides freely upon the shoe 118.

All of the parts described in the auxiliary equipment for effecting segmented discharge are constructed according to good mechanical construction principles, and do not require special materials. However, it has been found that the tape 102 may be a steel tape, and should be flexible and durable.

From the foregoing description many devices and methods within the intended scope of the present invention can be readily conceived by the man skilled in the art. For example, the discharge assembly 52 may be used with other types of equipment upon the charging face of the reactor, and vice versa, or the tape reel 56 may be positioned beneath the process tube 28 being discharged. For this reason, it is intended that the scope of the present invention be limited by the following claims, rather than by the specific methods and devices herein disclosed.

What is claimed is:

1. Apparatus for the irradiation of bodies comprising, in combination: a neutronic reactor having an active portion, a radiation shield disposed on at least two opposite sides of the active portion of the reactor, and tubes having charging and discharging ends traversing the shield and active portion of the reactor, said tubes having a pair of spaced longitudinal ribs for supporting the bodies therein; means to insert the bodies to be irradiated into the charging end of a tube, said means pushing bodies disposed within the tube along the length thereof; a flexible tape having a sufficiently small cross-section to slide between the ribs in the tube between the bodies and the tube, a tape reel removably mounted adjacent to the charging end of the tube, the tape being attached to the reel and adapted to be wound and unwound thereon; a detachable gripper slug removably attached to the tape at the discharging end of the tube, and a discharge assembly detachably affixed to the discharging end of the tube for guiding the path of the irradiated bodies being pushed out of the discharging end of the tube and of the gripper slug when entering the discharging end of the tube.

2. Apparatus for the irradiation of bodies comprising the elements of claim 1 wherein the discharge assembly comprises means to attach the discharge assembly to the discharge end of a reactor tube, a slideway attached to the means for attaching the discharge assembly to the tube, said slideway having a portion adapted to be disposed in a line with the tube, and a portion adapted to curve downwardly when the discharge assembly is affixed to the tube, a flared portion affixed to the attaching means funnelling from the slideway into the attaching means, and a container disposed beneath the slideway adapted to contain a gripper slug, the slideway forming a guide for irradiated bodies being removed from the tube and also for the gripper slug when being inserted into the tube.

3. A device for guiding cylindrical bodies from and into the discharge end of a process tube of a neutronic reactor comprising, in combination, a yoke provided with an aperture centrally thereof adapted to accommodate a mounting pin upon the upper surface of the end of the reactor tube, and a flared portion funnelling into the yoke, a supporting frame attached to the yoke, a slideway supported by the frame and the yoke disposed to have a portion forming a continuation of the process tube of the reactor and a U-shaped portion extending therefrom in a downward direction when attached to a reactor and a container mounted on the supporting frame at a point below the U-shaped portion of the slideway, said container being adapted to contain in an upright position a cylindrical body having a diameter smaller than the diameter of the process tube of the reactor and suitable for insertion into the reactor.

4. Apparatus for irradiation of bodies comprising, in combination: a neutronic reactor having an active portion, a radiation shield disposed on at least two opposite sides of the active portion of the reactor, and tubes transversing the shield and active portion, said tubes having charging and discharging ends and being provided with ribs for supporting the bodies therein; means to insert the bodies to be irradiated into the charging end of a tube, said means pushing the bodies out of the discharging end of said tube; a flexible tape slidably disposed between the ribs in a tube of the reactor; a discharge assembly characterized by the elements of claim 3 removably attached to the one end of the tube of the reactor; and a removable gripper slug secured to the end of the tape which extends from the discharge end of the reactor tube, said removable gripper slug being adapted to be disposed within the container of the discharge assembly removably attached to the discharge end of the process tube and to slide freely within the process tube.

5. Apparatus for the irradiation of bodies comprising, in combination: a neutronic reactor having an active portion, a radiation shield disposed on at least two opposite sides of the action portion of the reactor, and tubes having charging and discharging ends, transversing the shield and active portion and a pair of spaced ribs for supporting bodies disposed therein; means to insert the bodies to be irradiated into the charging end of a tube of said reactor and to translate the bodies within the tube along the length thereof; a flexible tape disposed in said tube between the ribs thereof and extending out of the discharging end of said tube; a removable gripper slug secured to the end of the tape extending from the discharging end of the reactor tube; and means to guide the gripper slug into the discharging end of the reactor tube.

6. Apparatus for the irradiation of bodies comprising the elements of claim 5 in combination with a shielding slug removably attached to the gripper slug between the gripper slug and the discharging end of the reactor tube.

7. A device for positioning bodies in a tube of a neutronic reactor comprising a flexible tape adapted to be inserted into one end of the tube and to extend therethrough, a gripper slug having a cross section slightly smaller than the internal cross section of the tube, said gripper slug being removably attached to the end of the tape, a shielding slug having a cross section slightly less than the internal cross section of the tube, said shielding slug having an aperture at one end, and the gripper slug having a protruding pin, the pin of the gripper slug being slidably disposed within the aperture of the shielding slug.

8. The method of charging bodies into a tube of a neutronic reactor which contains bodies to be discharged, the tube traversing radiation shields on opposite sides of the active portion of the reactor, comprising the steps of removing shielding elements at the charging end of the tube, inserting new bodies into the charging end of the tube sufficient to only partially fill the tube, thereafter inserting shielding elements into the charging end of the tube, pushing the charge within the tube toward the discharge end of the tube to push out of the discharge end of the tube the portion of the former charge to be discharged, and pulling all of the remaining bodies back toward the charging end of the tube to center the total remaining charge of bodies in the tube.

9. The method of charging bodies into a tube of a neutronic reactor which contains bodies to be discharged, the tube traversing radiation shields on opposite sides of the active portion of the reactor, comprising the steps of claim 8 and inserting shielding elements at the discharge end of the tube following the centering of the total charge of bodies in the tube.

10. The method of charging bodies into a tube of a neutronic reactor which contains bodies to be discharged, the tube having a charging end and a discharging end and traversing radiation shields on opposite sides of the active portion of the reactor, comprising the steps of removing shielding elements from the charging end of the tube, inserting new bodies into the tube from the charging end sufficient to only partially fill the tube, pushing the total charge of bodies in the tube toward the discharge end thereof to push the bodies to be removed from the discharge end of the tube, inserting shielding elements into the charging end of the tube, and pulling a shielding element into the discharge end of the tube from the charging end of the tube, thereby centering the charge of bodies in the tube and disposing at opposite ends of the tube radiation shielding elements.

11. Apparatus for the irradiation of bodies comprising, in combination: a neutronic reactor having an active portion, a radiation shield disposed on at least two opposite sides of the active portion of the reactor, and tubes traversing the shield and active portion, said tubes being provided with a pair of spaced longitudinal ribs for supporting the bodies therein and having charging ends passing through one shield and discharging ends passing through the other shield; means to insert bodies into the charging end of the tubes and to translate bodies disposed within the tube away from the charging end thereof; means for pulling the bodies within one of the tubes toward the charging end thereof including a tape reel removably mounted to the side of the reactor adjacent to said tube, a flexible tape attached to the reel at one end and mounted thereabout, said tape having a sufficiently small cross section to slide between the ribs within the tube and beneath the bodies supported upon the ribs thereof, and a gripper slug removably attached to the tape on the end opposite to the tape reel and so adapted to slide within the tube; and means to insert bodies of radiation shielding material into the discharge end of the tube.

12. The method of operating a neutronic reactor having an active portion, a radiation shield disposed on at least two opposite sides of the active portion, tubes traversing the shield and active portion, said tubes having charging and discharging ends and being provided with ribs for supporting bodies therein comprising the steps of placing bodies to be irradiated upon the ribs within the tubes of the reactor in abutting relationship, placing shielding elements at the charging and discharging ends of the tubes, establishing a neutronic chain reaction within the tubes, shutting down the neutronic chain reaction after the lapse of a period of time, removing the shielding elements from the charging end of one of the tubes, inserting new bodies into the tube from the charging end sufficient to only partially fill the tube, inserting new shielding elements into the charging end of the tube, pushing the charge within the tube toward the discharge end of the tube to push out of the discharge end of the tube the portion of the former charge to be discharged, sliding a flexible tape through the tube beneath the bodies within the tube and between the ribs of the tube from the charging end, securing a gripping slug to the tape adjacent to the discharge end of the tube, pulling the gripper slug into the tube by drawing the tape, thereby pulling the bodies back toward the charging end of the tube to center the remaining charges in the tube, and reestablishing a neutronic chain reaction within the reactor.

13. The method of operating a neutronic reactor having an active portion, a radiation shield disposed on at least two opposite sides of the active portion, tubes traversing the shield and active portion, said tubes having charging and discharging ends and being provided with ribs for supporting bodies therein comprising the steps of placing bodies to be irradiated upon the ribs within the tubes of the reactor in abutting relationship, placing shielding elements at the charging and discharging ends of the tubes, establishing a neutronic chain reaction within the tubes, shutting down the neutronic chain reaction after the lapse of a period of time, removing the shielding elements from the charging end of one of the tubes, inserting new bodies into the tube from the charging end sufficient to only partially fill the tube, inserting new shielding elements into the charging end of the tube, pushing the charge within the tube toward the discharge end of the tube to push out of the discharge end of the tube the portion of the former charge to be discharged, sliding a flexible tape through the tube beneath the bodies within the tube and between the ribs of the tube from the charging end, securing a gripping slug to the tape adjacent to the discharge end of the tube, removably attaching a shielding element to the gripper slug, pulling the gripper slug into the tube by drawing the tape, thereby pulling the bodies toward the charging end of the tube to center the remaining charges, releasing the shielding element within the tube of the reactor, thereby centering the charge of bodies in the tube, and reestablishing a neutronic chain reaction within the reactor.

14. A neutronic reactor comprising, in combination, an active portion, a radiation shield disposed on two opposite sides of the active portion, parallel tubes having axial ribs therein disposed within the active portion having charging ends extending through one shield and discharging ends extending through the other shield, a slideway removably attached to the reactor having a straight portion aligned with the discharge end of one of the tubes and a U-shaped portion secured to the end of the straight portion and extending downward therefrom, and a container attached to the slideway having an opening confronting the lower extremity of the U-shaped portion of the slideway, a tape disposed between the ribs of one of the tubes extending through the discharge end of the tube and along the slideway, and a removable gripper attached to the end of the tape and adapted to be disposed in the container.

References Cited in the file of this patent

UNITED STATES PATENTS

| | | |
|---|---|---|
| 650,136 | Runnette | May 22, 1900 |
| 1,705,621 | Laurence | Mar. 19, 1929 |
| 2,024,949 | Schefe | Dec. 17, 1935 |
| 2,423,629 | Vageli | July 8, 1949 |
| 2,500,223 | Wells et al. | Mar. 14, 1950 |
| 2,708,656 | Fermi et al. | May 17, 1955 |
| 2,736,696 | Wigner et al. | Feb. 28, 1956 |

FOREIGN PATENTS

| | | |
|---|---|---|
| 9,817 | Great Britain | of 1909 |
| 191,538 | Great Britain | Jan. 18, 1923 |

OTHER REFERENCES

Smyth: A General Account of the Development of Methods of Using Atomic Energy for Military Purposes Under the Auspices of the United States Government 1940–1945, pp. 83 and 103 (1945).

Goodman: The Science and Engineering of Nuclear Power, vol. 1, p. 319 (1947). Addison-Wesley Press, Cambridge, Mass.

Page 85 of the Smyth report of record is added to the record.